US012691644B2

(12) United States Patent
Chowdhury

(10) Patent No.: US 12,691,644 B2
(45) Date of Patent: Jul. 28, 2026

(54) APPARATUSES, TACKING STICKS, AND SYSTEMS FOR TACKING WORKPIECES IN COMPOSITE MANUFACTURING AND METHODS ASSOCIATED THEREWITH

(71) Applicant: The Boeing Company, Arlington, VA (US)

(72) Inventor: Nayeem Chowdhury, Melbourne (AU)

(73) Assignee: The Boeing Company, Arlington, VA (US)

( * ) Notice: Subject to any disclaimer, the term of this patent is extended or adjusted under 35 U.S.C. 154(b) by 559 days.

(21) Appl. No.: 18/166,006

(22) Filed: Feb. 8, 2023

(65) Prior Publication Data

US 2024/0262045 A1    Aug. 8, 2024

(51) Int. Cl.
*B29C 65/00*        (2006.01)
*B29C 65/20*        (2006.01)
*B29C 65/30*        (2006.01)

(52) U.S. Cl.
CPC ............ *B29C 66/824* (2013.01); *B29C 65/20* (2013.01); *B29C 65/30* (2013.01); *B29C 66/721* (2013.01)

(58) Field of Classification Search
CPC ..... B29C 66/824; B29C 66/721; B29C 65/20; B29C 65/30; B29C 70/543; D04H 3/14; D04H 3/147; D04H 3/153
See application file for complete search history.

(56) References Cited

U.S. PATENT DOCUMENTS

| | | | |
|---|---|---|---|
| 6,773,535 B1 | 8/2004 | Wetzel | |
| 9,242,441 B1 * | 1/2016 | Gendreau | H01H 37/006 |

| | | | |
|---|---|---|---|
| 2009/0043288 A1 * | 2/2009 | Petrakis | G01K 5/483 |
| | | | 60/527 |
| 2011/0173970 A1 * | 7/2011 | Torres-Jara | F03G 7/06 |
| | | | 60/527 |
| 2016/0200014 A1 | 7/2016 | Patberg et al. | |
| 2018/0222060 A1 * | 8/2018 | Petrovski | B29C 53/04 |
| 2018/0284475 A1 * | 10/2018 | Howarth | F03G 7/0665 |
| 2021/0188461 A1 | 6/2021 | Marcoe et al. | |

(Continued)

FOREIGN PATENT DOCUMENTS

| | | |
|---|---|---|
| EP | 3 858 585 | 8/2021 |
| EP | 4 209 333 | 7/2023 |

(Continued)

OTHER PUBLICATIONS

Innovative Sensor Technology, "Micro Heaters" https://www.ist-ag.com/en/micro-heaters.

(Continued)

*Primary Examiner* — Andrew L Swanson

(74) *Attorney, Agent, or Firm* — Walters & Wasylyna LLC

(57)        ABSTRACT

A tacking element for tacking workpieces in composite manufacturing includes a base member, an actuating member and a heating member. The actuating member secured to the base member. The heating member disposed on the base member or the actuating member and configured to selectively radiate heat toward the actuating member. The actuating member is configured to transform from an inactive position to an active position in response to the heat from the heating member. A tacking stick and system that implements the tacking element is provided. A method for tacking workpieces in composite manufacturing is also provided.

24 Claims, 18 Drawing Sheets

(56) References Cited

U.S. PATENT DOCUMENTS

| | | | |
|---|---|---|---|
| 2022/0072816 A1* | 3/2022 | Yousefpour | B29D 99/0003 |
| 2022/0136488 A1* | 5/2022 | Kazi | G02B 6/3859 |
| | | | 60/527 |
| 2022/0412327 A1* | 12/2022 | Brown | F03G 7/0614 |
| 2023/0191728 A1* | 6/2023 | Woods | B29C 66/721 |
| | | | 156/242 |

FOREIGN PATENT DOCUMENTS

| | | |
|---|---|---|
| JP | H04-171392 | 6/1992 |
| JP | H05-104632 | 4/1993 |

OTHER PUBLICATIONS

Terekjov et al: "Binders Used for the Manufacturing of Composite Materials by Liquid Composite Molding," *polymers,* MDPI (2021).
European Patent Office, Extended European Search Report, App. No. 23216125.7 (May 31, 2024).
European Patent Office, "Communication pursuant to Article 94(3) EPC," App. No. 23 216 125.7 (Mar. 18, 2025).

* cited by examiner

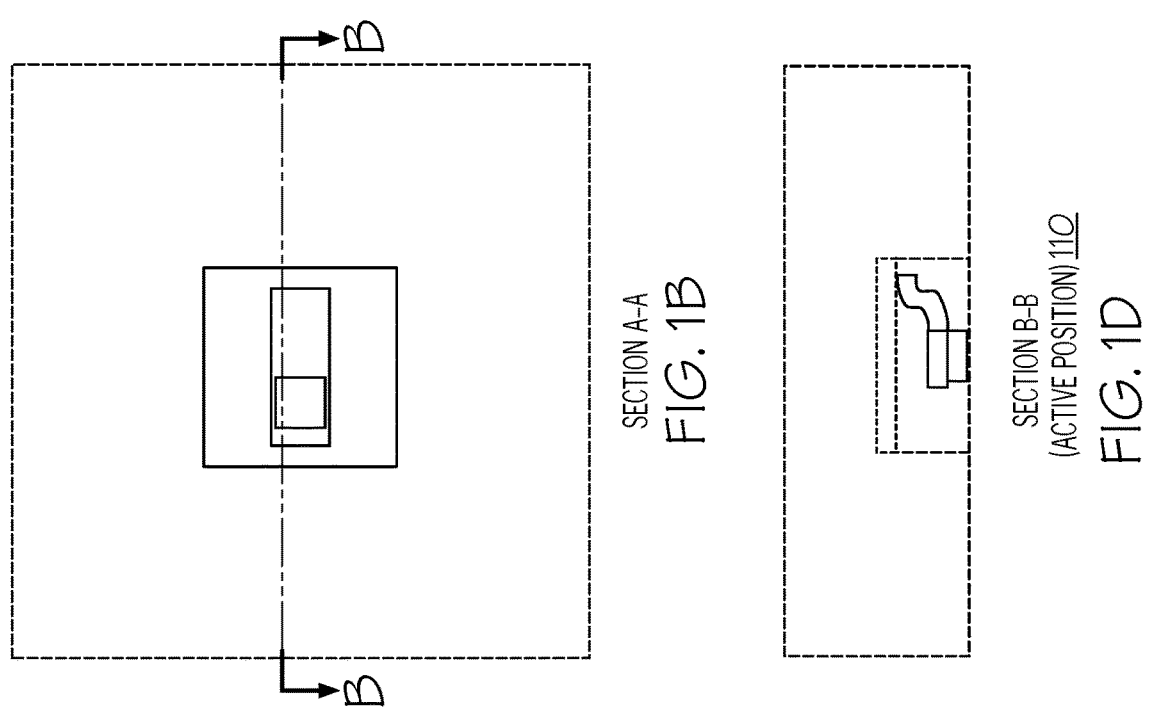
SECTION A-A
*FIG. 1B*
EXPLODED VIEW
*FIG. 1A*
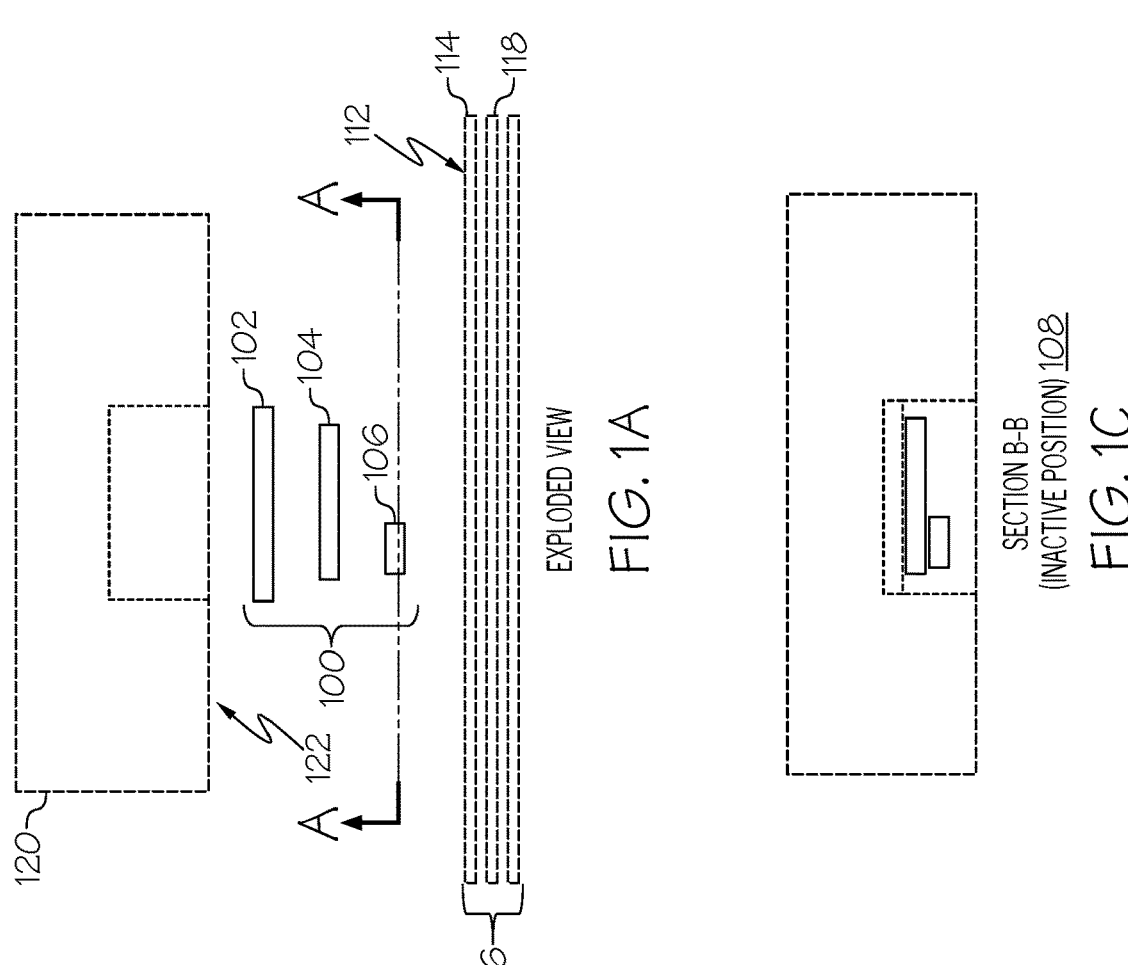
SECTION B-B
(ACTIVE POSITION) 110
*FIG. 1D*
SECTION B-B
(INACTIVE POSITION) 108
*FIG. 1C*

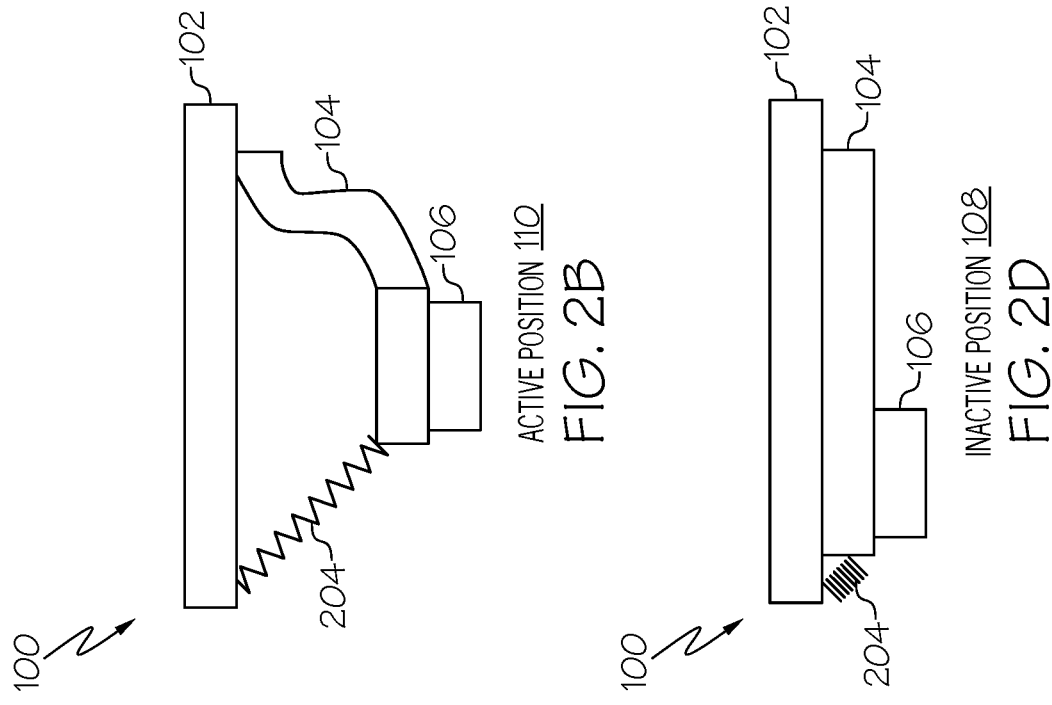
ACTIVE POSITION 110
FIG. 2A
ACTIVE POSITION 110
FIG. 2B
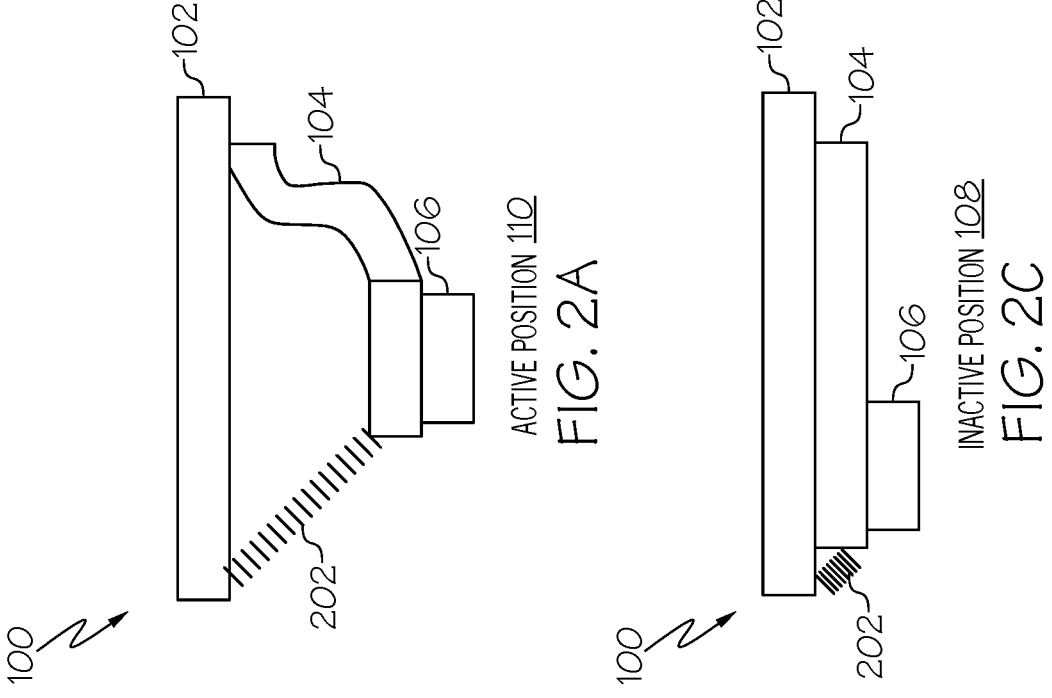
INACTIVE POSITION 108
FIG. 2C
INACTIVE POSITION 108
FIG. 2D

INACTIVE POSITION

ACTIVE POSITION

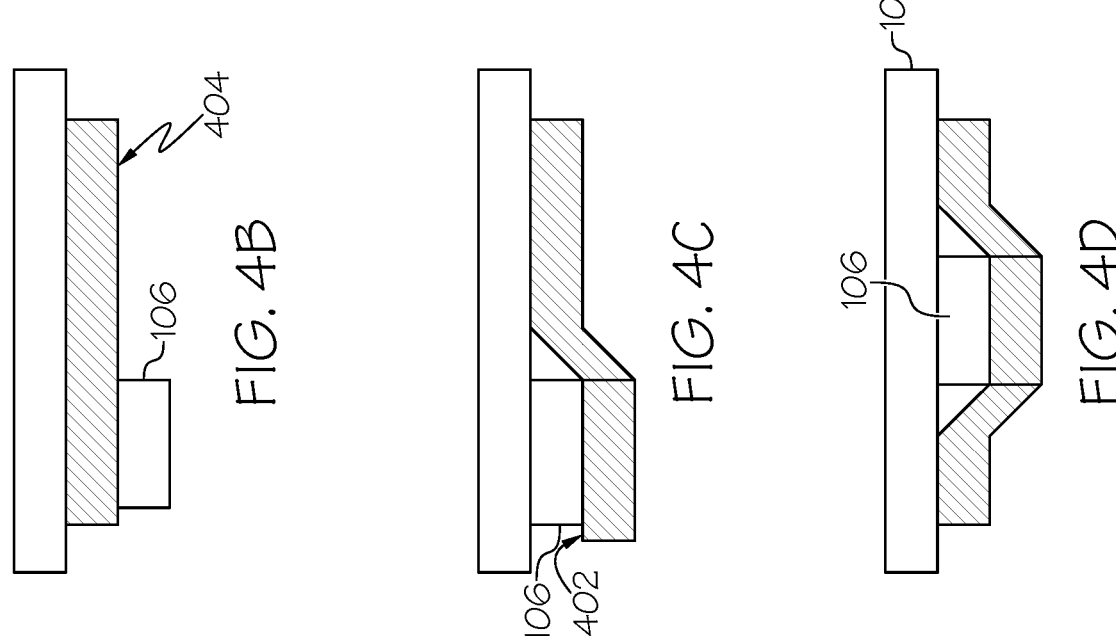
FIG. 4B
FIG. 4C
FIG. 4D
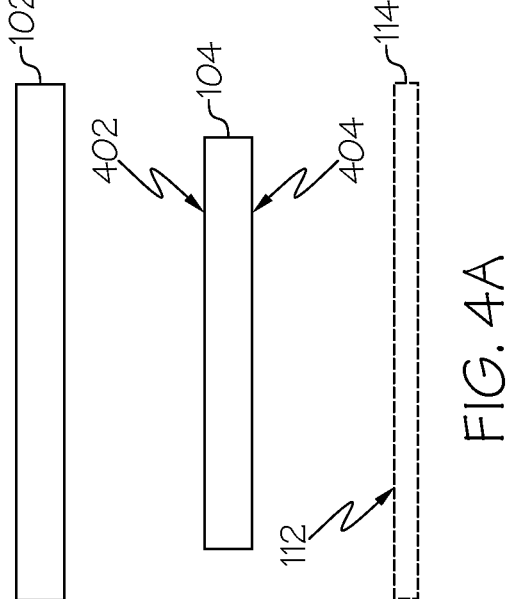
FIG. 4A

INACTIVE POSITION

ACTIVE POSITION

APPARATUSES, TACKING STICKS, AND SYSTEMS FOR TACKING WORKPIECES IN COMPOSITE MANUFACTURING AND METHODS ASSOCIATED THEREWITH

FIELD

The present disclosure relates generally to tacking workpieces in composite manufacturing and, particularly, to various examples of tacking elements, tacking sticks, and systems for tacking workpieces in composite manufacturing. Various examples of methods for tacking workpieces in composite manufacturing are also disclosed. For example, applications of tacking workpieces can be used to tack plies of dry reinforcement fabric for composite materials used in aircraft. Applications to other types of workpieces, various types of composite materials, and other types of products are also contemplated.

BACKGROUND

Manual and automated tacking approaches are used in producing composite parts from dry fabrics. The manual approach relies on an operator with a soldering iron to perform tacking of adjacent plies of dry fabric. The automated approach uses cartridge style heating elements to perform localized tacking of the adjacent plies. The cartridge style heating elements are long and difficult to integrate into automated production methods. Another drawback of cartridge style heating elements is that cooling is slow which requires removal of the heating surface from the material after a few seconds. Moreover, the heating element may be left on during tacking operations due to the slow heating and cooling of the cartridge style heating element. This is not an efficient use of energy.

Accordingly, those skilled in the art continue with research and development efforts to streamline tacking operations for composite manufacturing to improve automated production methods.

SUMMARY

Disclosed are examples of apparatuses, tacking sticks, and systems for tacking workpieces in composite manufacturing. Examples of methods for tacking workpieces in composite manufacturing are also disclosed. The following is a non-exhaustive list of examples, which may or may not be claimed, of the subject matter according to the present disclosure.

In an example, the disclosed apparatus for tacking workpieces in composite manufacturing includes a base member, an actuating member and a heating member. The actuating member is at least partially secured to the base member. The heating member disposed on at least one of the base member and the actuating member and configured to selectively radiate heat toward the actuating member. The actuating member is configured to transform from an inactive position to an active position in response to the heat from the heating member.

In an example, the disclosed tacking stick for tacking workpieces in composite manufacturing includes a support structure and a plurality of tacking elements embedded in the support structure. The support structure includes comprising a contact surface opposing a work surface of a first workpiece of a stack of workpieces. The contact surface of the support structure is configured to engage with the work surface of the first workpiece. Each tacking element extends through the contact surface of the support structure.

In an example, the disclosed method for tacking workpieces in composite manufacturing includes: (1) selectively heating a heating member of a tacking element; (2) transforming an actuating member from an inactive position to an active position; and (3) locally tacking a first workpiece of a stack of workpieces to at least an adjacent workpiece of the stack of workpieces while the actuating member is in the active position.

In an example, the disclosed system for tacking workpieces in composite manufacturing includes an end effector, a mechanical arm and a computerized control system. The end effector includes a tacking stick. The tacking stick includes a support structure and a plurality of tacking elements. The support structure includes a contact surface. The plurality of tacking elements are embedded in the support structure and extend through the contact surface of the support structure. Each tacking element includes a base member, an actuating member with shape memory, and a heating member. The actuating member is at least partially secured to the base member. The heating member disposed on at least one of the base member and the actuating member. The mechanical arm configured to receive the end effector. The computerized control system is configured to control the mechanical arm, the end effector, the tacking stick, and the plurality of tacking elements by implementing a method for tacking workpieces in composite manufacturing. The method includes: (1) selectively heating the heating member of a select tacking element; (2) transforming the actuating member of the select tacking element from an inactive position to an active position; and (3) locally tacking a first workpiece of a stack of workpieces to at least an adjacent workpiece of the stack of workpieces while the actuating member of the select tacking element is in the active position.

Other examples of the disclosed methods and systems will become apparent from the following detailed description, the accompanying drawings, and the appended claims.

BRIEF DESCRIPTION OF THE DRAWINGS

FIGS. 1A-D provide a functional exploded view of an example of a tacking element for tacking workpieces in composite manufacturing, and several cross-sectional views;

FIGS. 2A-D provide partial side views of several examples of transitioning the actuating member of the tacking element of FIG. 1D from an active position to an inactive position;

FIGS. 4A-D include a functional exploded side view of another example of a tacking element for tacking workpieces in composite manufacturing and partial side views of several other examples of the tacking element;

DETAILED DESCRIPTION

Figure 3B:
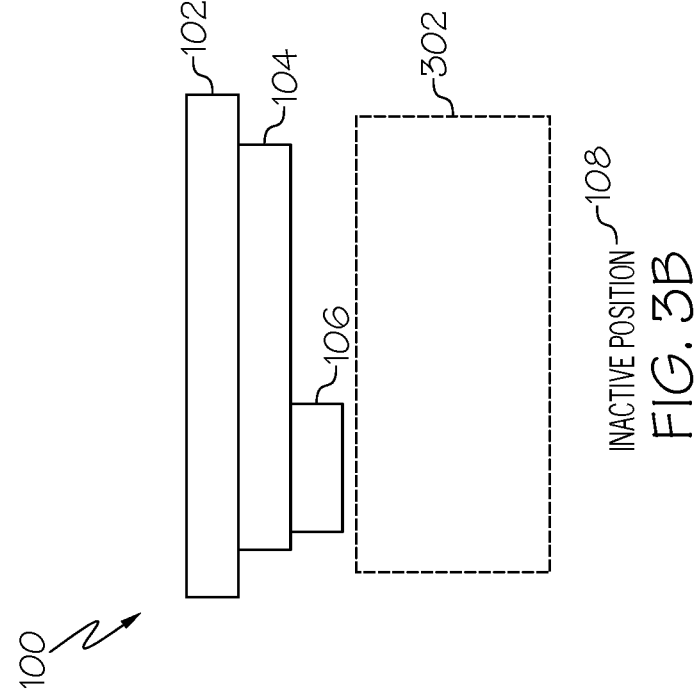
FIGS. 3A-B provide partial side views of another example of transitioning the actuating member of the tacking element of FIG. 1D from an active position to an inactive position.
Figure 3A:
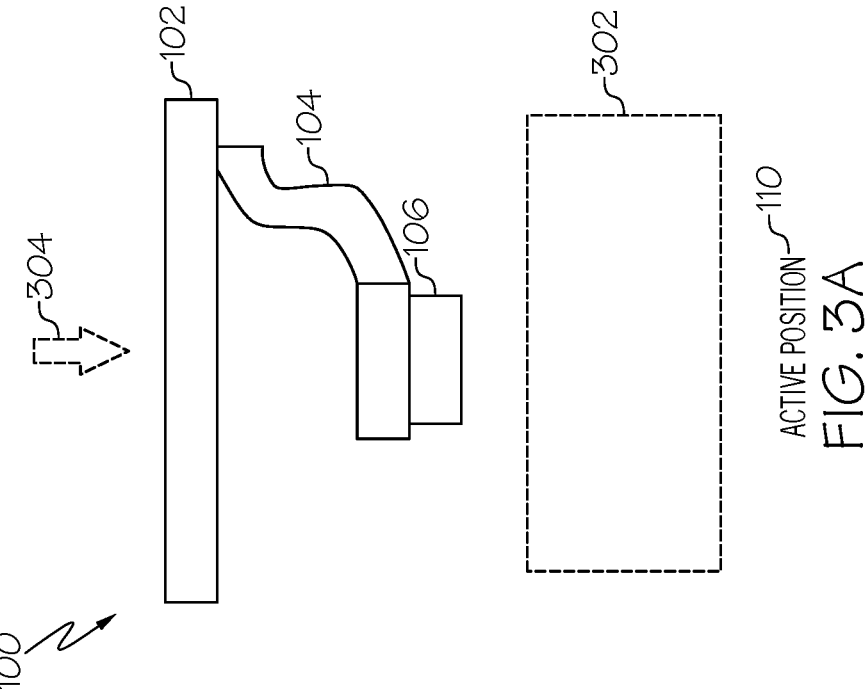
Figure 5:
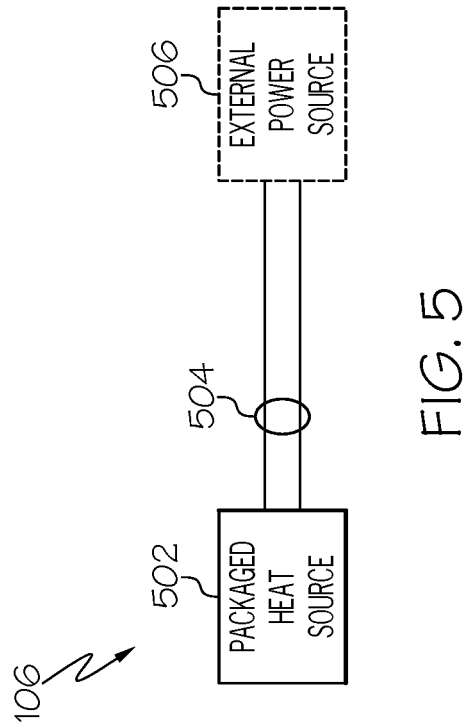
FIG. 5 is a functional block diagram of an example of a heating element of the tacking element in FIG. 1A.

Referring generally to FIGS. 1A-D, 2A-D, 3A-B, 4A-D, 5 and 12-15, by way of examples, the present disclosure is directed to a tacking element 100 for tacking workpieces in composite manufacturing. FIG. 1A discloses an example of the tacking element 100 that includes a base member 102, an actuating member 104 and a heating member 106. FIGS. 2A-D, 3A-B, 4A-D, 5 and 12-15 disclose various examples of the tacking element 100.

With reference again to FIGS. 1A-D, in one or more examples, a tacking element 100 for tacking workpieces in composite manufacturing includes a base member 102, an actuating member 104 at least partially secured to the base member 102, and a heating member 106 disposed on at least one of the base member 102 and the actuating member 104. The heating member configured to selectively radiate heat toward the actuating member 104. The actuating member 104 is configured to transform from an inactive position 108 to an active position 110 in response to the heat from the heating member 106.

In another example of the tacking element 100, the actuating member 104 includes a shape memory alloy. In a further example, the shape memory alloy includes aluminium (Al), cadmium (Cd), copper (Cu), gold (Au), iron (Fe), manganese (Mn), nickel (Ni), silicon (Si), titanium (Ti), zinc (Zn) or any suitable material with shape memory in any suitable combination. In another further example, the shape memory alloy includes nickel-titanium (Ni—Ti), copper-aluminum-nickel (Cu—Al—Ni), copper-zinc-aluminum (Cu—Zn—Al), iron-manganese-silicon (Fe—Mn—Si), gold-cadmium (Au—Cd), or any suitable shape memory alloy.

In yet another example of the tacking element 100, the actuating member 104 is configured to transform to the active position 110 in response to the heat reaching a predetermined temperature. For example, the predetermined temperature may range from 200° C. to 280° C. In another example, the predetermined head may be up to 300° C.

In still another example, the tacking element 100 is configured to be disposed such that the active position 110 of the actuating member 104 is proximate to a work surface 112 of a first workpiece 114 of a stack of workpieces 116.

In a further example, the tacking element 100 is configured to be embedded in a support structure 120 with a contact surface 122. In this example, the tacking element 100 is configured to extend through the contact surface 122 of the support structure 120. In an even further example, the contact surface 122 of the support structure 120 opposes the work surface 112 of the first workpiece 114. In this example, the contact surface 122 is configured to engage with the work surface 112. For example, the support structure 120 may include a plurality of cavities configured to receive the plurality of tacking elements 100 to facilitate the embedding.

In another further example, the tacking element 100 is configured to locally tack the first workpiece 114 to at least an adjacent workpiece 118 of the stack of workpieces 116 in response to at least one of the actuating member 104 and the heating member 106 being disposed proximate to the work surface 112 of the first workpiece 114 while the actuating member 104 is in the active position 110. For example, a given workpiece (e.g., first workpiece 114) may also be referred to as a ply. In this example, the stack of workpieces 116 may also be referred to as a stack of plies. In various examples, a given ply may be referred to as a reinforcement fabric that includes carbon fibers and/or other types of suitable fibers. Thermoplastic and/or resin is included in the stack of workpieces 116 (e.g., stack of plies) using any suitable technique. For example, a thermoplastic veil may be between adjacent plies or interleaved in the stack. In some examples, a ply may refer to the combination of the dry fabric and an accompanying veil. Alternatively, thermoplastic particles may be integrated into the dry fabric in any suitable manner. For example, the fabric may be pre-impregnated with resin which is referred to as pre-impregnated fabric or pre-preg. In any regard, the tacking operation heats the thermoplastic and/or resin to tack two or more layers of the stack of workpieces 116.

In yet another further example, the tacking element 100 is configured to locally tack the first workpiece 114 to at least an adjacent workpiece 118 of the stack of workpieces 116 in response to at least one of the actuating member 104 and the heating member 106 contacting the work surface 112 of the first workpiece 114 while the actuating member 104 is in the active position 110.

It still another further example, the tacking element 100 is configured to locally compress the stack of workpieces 116 in response to at least one of the actuating member 104 and the heating member 106 contacting the work surface 112 of the first workpiece 114 while the actuating member 104 is in the active position 110. For example, in the active position, the actuating member 104 may be constructed of material capable of applying up to approximately 75 Kilopascal (kPa) units of pressure to the work surface 112 of the first workpiece 114.

In still yet another further example, the tacking element 100 is configured to locally compact the stack of workpieces 116 in response to at least one of the actuating member 104 and the heating member 106 contacting the work surface 112 of the first workpiece 114 while the actuating member 104 is in the active position 110. For example, in the active position, the actuating member 104 may be constructed of material capable of applying up to approximately 75 kPa units of pressure to the work surface 112 of the first workpiece 114.

With reference again to FIGS. 1A, 2A-B and 3A-B, in still yet another example, the tacking element 100 is configured to transform the actuating member 104 from the active position 110 to the inactive position 108 using at least one of a biasing spring 202, a shape memory effect associated with the actuating member 104, a second actuating member 204 with shape memory, and an insert 302 fitted for compression of the actuating member 104 in any suitable combination.

An example of the shape memory effect associated with the actuating member 104 is where the actuating member 104 includes a shape memory alloy capable of being trained to exhibit multiple shape memory effects. A first shape memory effect is triggered by the heating member 106 and transforms the actuating member 104 from an inactive position to an active position for the tacking operation. A second shape memory effect is triggered by a lower temperature that transforms the actuating member 104 from the active position to the inactive position after the tacking operation.

An example of a second actuating member 204 with shape memory is a second actuating member 204 that includes a shape memory alloy that is trained to be triggered to apply a force that transforms the actuating member 204 from the active position to the inactive position at a predetermined temperature. The tacking element 100 may include additional components, such as a second heating member, to radiate heat that triggers the second actuating member 204.

In another example of the tacking element 100, the base member 102 includes an insulating material.

With reference again to FIGS. 1A and 4A-D, in yet another example of the tacking element 100, the actuating member 104 includes a first surface 402 facing the base member 102 and a second surface 404 configured to face a work surface 112 of a first workpiece 114 of a stack of workpieces 116. In a further example, the heating member 106 is secured to the first surface 402 of the actuating member 104. In another further example, the heating member 106 is secured to the second surface 404 of the actuating member 104. In still another example of the tacking element 100, the heating member 106 is embedded within the actuating member 104. For example, the support structure 120 may include a plurality of cavities configured to receive the plurality of tacking elements 100 to facilitate the embedding.

With reference again to FIGS. 1A and 5, in still yet another example of the tacking element 100, the heating member 106 comprises a packaged heat source 502 and at least two leads 504, wherein the packaged heat source 502 is less than 3 mm in height with a planar area of less than 30 mm2. In another example of the tacking element 100, the heating member 106 includes a micro heater, a thick film heater, a resistive heating element, or any suitable heating member in any suitable combination. For example, the heating member 106 may include a Micro Heater manufactured by Innovative Sensor Technology IST AG of Ebnat-Kappel, Switzerland or a suitable equivalent. In yet another example of the tacking element 100, the heating member 106 is configured to receive electrical power from an external power source 506.

Figures 6A, 6B:
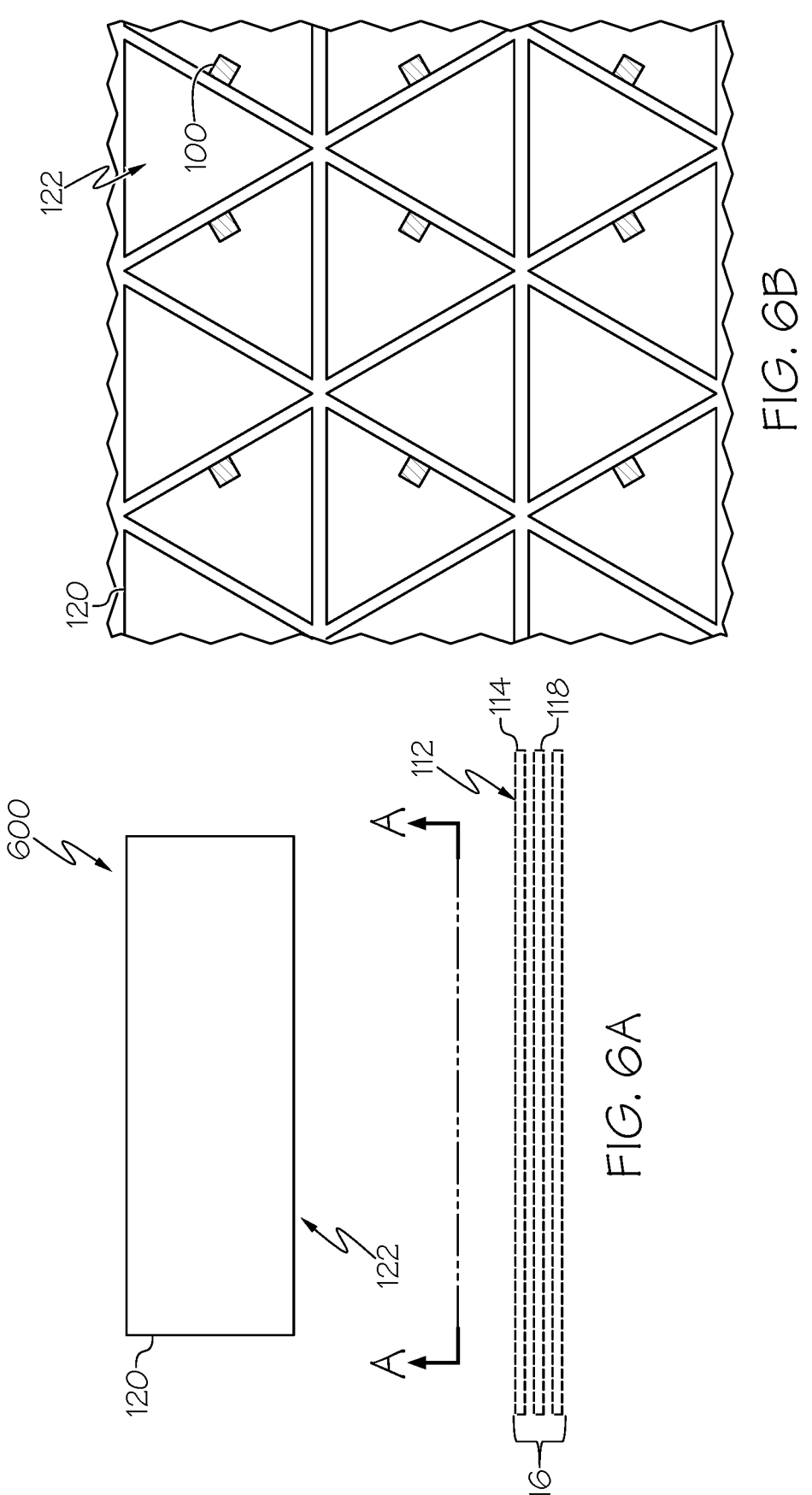
FIGS. 6A-B include a functional exploded side view of an example of a tacking stick for tacking workpieces in composite manufacturing and a cross-sectional view.
Figure 7:
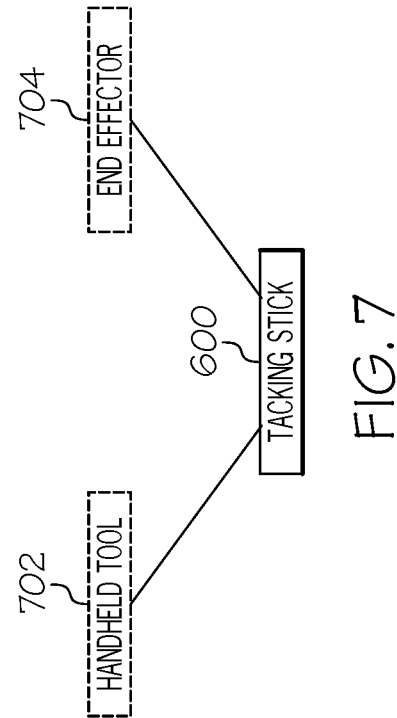
FIG. 7 is a functional block diagram showing several examples of techniques for using the tacking stick of FIGS. 6A-B.

Referring generally to FIGS. 1A, 2A-B, 3A, 4A, 5, 6A-B, 7 and 16, by way of examples, the present disclosure is directed to a tacking stick 600 for tacking workpieces in composite manufacturing. FIGS. 6A-B disclose an example of the tacking stick 600 that includes a support structure 120 and a plurality of tacking elements 100. FIGS. 1A, 2A-B, 3A, 4A, 5, 7 and 16 disclose various examples of the tacking stick 600.

With reference again to FIGS. 1A and 6A-B, in one or more examples, a tacking stick 600 for tacking workpieces in composite manufacturing includes a support structure 120 and a plurality of tacking elements 100 embedded in the support structure 120. The support structure 120 includes a contact surface 122 opposing a work surface 112 of a first workpiece 114 of a stack of workpieces 116. The contact surface 122 of the support structure 120 is configured to engage with the work surface 112 of the first workpiece 114. Each tacking element 100 extends through the contact surface 122 of the support structure 120. For example, the support structure 120 may include a plurality of cavities configured to receive the plurality of tacking elements 100 to facilitate the embedding.

In another example of the tacking stick 600, each tacking element 100 includes a base member 102, an actuating member 104 and a heating member 106. The actuating member 104 is at least partially secured to the base member 102. The heating member 106 disposed on at least one of the base member 102 and the actuating member 104 and configured to selectively radiate heat toward the actuating member 104. The actuating member 104 is configured to transform from an inactive position 108 to an active position 110 in response to the heat from the heating member 106.

In yet another example of the tacking stick 600, the plurality of tacking elements 100 are configured to be disposed within the support structure 120 such that the active position 110 of the actuating member 104 of each tacking element 100 is proximate to a work surface 112 of a first workpiece 114 of a stack of workpieces 116.

In a further example, each tacking element 100 of the plurality of tacking elements 100 is configured to locally tack the first workpiece 114 to at least an adjacent workpiece 118 of the stack of workpieces 116 in response to at least one of the actuating member 104 and the heating member 106 being disposed proximate to the work surface 112 of the first workpiece 114 while the actuating member 104 is in the active position 110. For example, a given workpiece (e.g., first workpiece 114) may also be referred to as a ply. In this example, the stack of workpieces 116 may also be referred to as a stack of plies. In various examples, a given ply may be referred to as a reinforcement fabric that includes carbon fibers and/or other types of suitable fibers. Thermoplastic and/or resin is included in the stack of workpieces 116 (e.g., stack of plies) using any suitable technique. For example, a thermoplastic veil may be between adjacent plies or interleaved in the stack. In some examples, a ply may refer to the combination of the dry fabric and an accompanying veil. Alternatively, thermoplastic particles may be integrated into the dry fabric in any suitable manner. For example, the fabric may be pre-impregnated with resin which is referred to as pre-impregnated fabric or pre-preg. In any regard, the tacking operation heats the thermoplastic and/or resin to tack two or more layers of the stack of workpieces 116.

In another further example, each tacking element 100 of the plurality of tacking elements 100 is configured to locally tack the first workpiece 114 to at least an adjacent workpiece 118 of the stack of workpieces 116 in response to at least one of the actuating member 104 and the heating member 106 of the corresponding tacking element 100 contacting the work surface 112 of the first workpiece 114 while the actuating member 104 of the corresponding tacking element 100 is in the active position 110.

In yet another further example, each tacking element 100 of the plurality of tacking elements 100 is configured to locally compress the stack of workpieces 116 in response to at least one of the actuating member 104 and the heating member 106 contacting the work surface 112 of the first workpiece 114 while the actuating member 104 is in the active position 110. For example, in the active position, the actuating member 104 may be constructed of material capable of applying up to approximately 75 kPa units of pressure to the work surface 112 of the first workpiece 114.

In still another further example, each tacking element 100 of the plurality of tacking elements 100 is configured to locally compact the stack of workpieces 116 in response to at least one of the actuating member 104 and the heating member 106 contacting the work surface 112 of the first workpiece 114 while the actuating member 104 is in the active position 110. For example, in the active position, the actuating member 104 may be constructed of material capable of applying up to approximately 75 kPa units of pressure to the work surface 112 of the first workpiece 114.

In still another example of the tacking stick 600, the plurality of tacking elements 100 are arranged in at least one of parallel rows and parallel columns. In still yet another example of the tacking stick 600, the plurality of tacking elements 100 are arranged in an array. In other examples, the plurality of tacking elements 100 may be distributed in any suitable arrangement.

With reference again to FIGS. 6A-B and 7, in one or more examples, the tacking stick 600, is configured to be secured to at least one of a handheld tool 702 and an end effector 704. The handheld tool 702 with the tacking stick 600 may be a single person lift or a multi-person lift depending on the weight of the items and applicable safety requirements. The tacking stick 60 may be secured to the end effector 704 by any suitable means.

Figure 8:
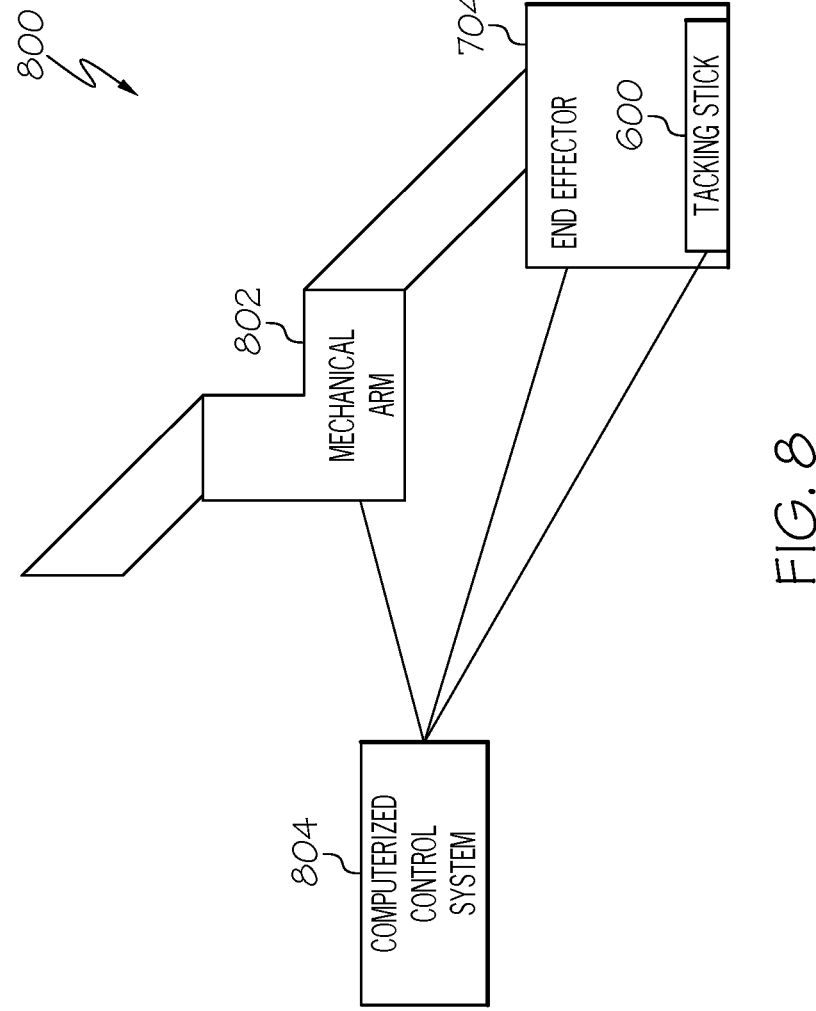
FIG. 8 is a functional block diagram of an example of a system for tacking workpieces in composite manufacturing.

Referring generally to FIGS. 1A, 2A-B, 3A, 4A, 5, 6A-B. 7, 8 and 16, by way of examples, the present disclosure is directed to a system 800 for tacking workpieces in composite manufacturing. FIG. 8 discloses an example of the system 800 that includes an end effector 704, a mechanical arm 802 and a computerized control system 804. The end effector 704 includes the tacking stick 600. FIGS. 1A, 2A-B, 3A, 4A, 5, 6A-B, 7 and 16 disclose various examples of the system 800.

With reference again to FIGS. 1A, 6A-B, 7 and 8, in one or more examples, a system 800 for tacking workpieces in composite manufacturing includes an end effector 704, a mechanical arm 802 and a computerized control system 804. The end effector 704 includes the tacking stick 600 of FIGS. 6A-B. The mechanical arm 802 configured to receive the end effector 704. The computerized control system 804 configured to control the mechanical arm 802, the end effector 704, the tacking stick 600, and each tacking element 100 of the plurality of tacking elements 100 to tack a first workpiece 114 to at least an adjacent workpiece 118 of a stack of workpieces 116 in response to at least one of the actuating member 104 and the heating member 106 of the corresponding tacking element 100 contacting the work surface 112 of the first workpiece 114 while the actuating member 104 of the corresponding tacking element 100 is in the active position 110.

Figure 9:
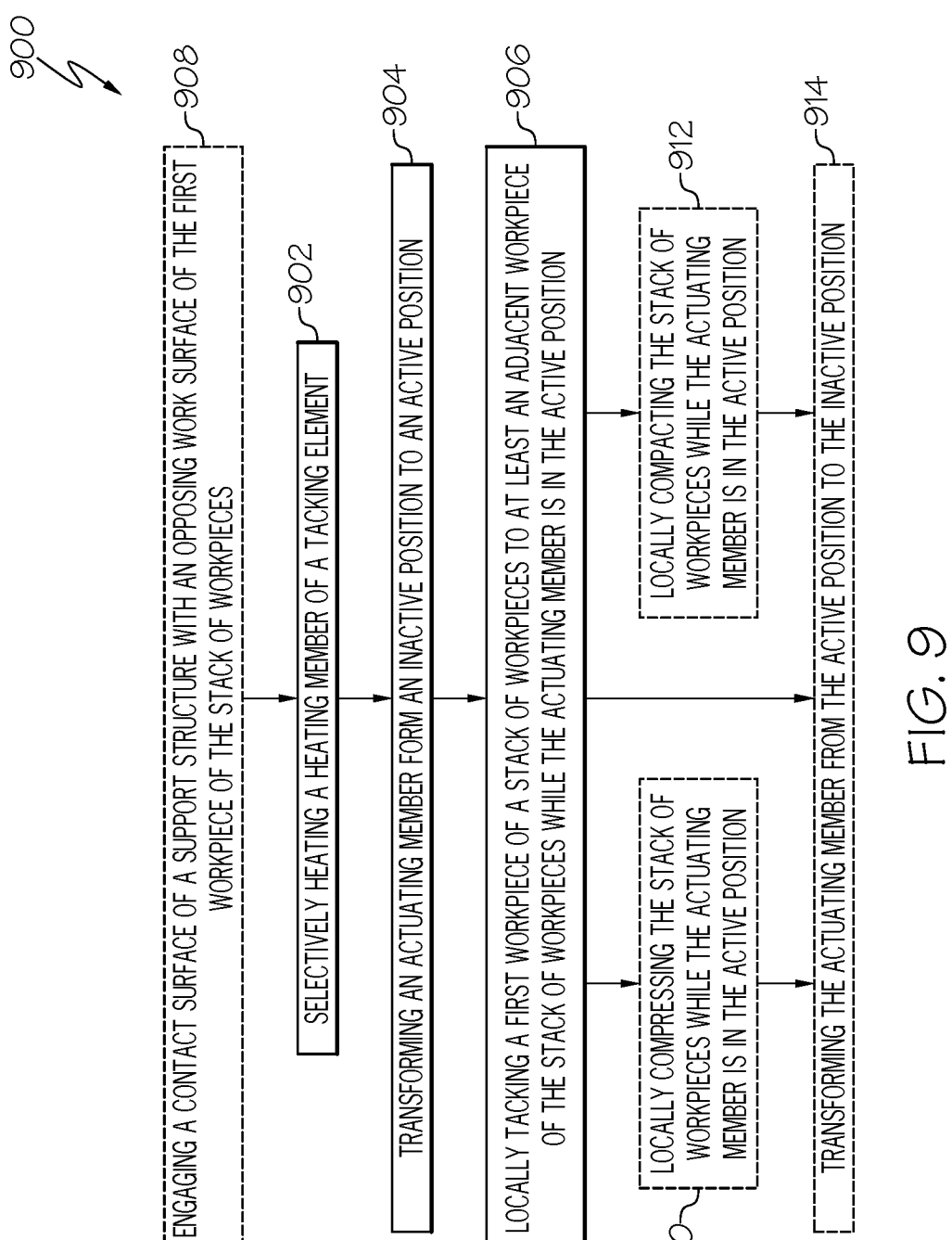
FIG. 9 is a flow diagram of an example of a method for tacking workpieces in composite manufacturing.
Figure 10:
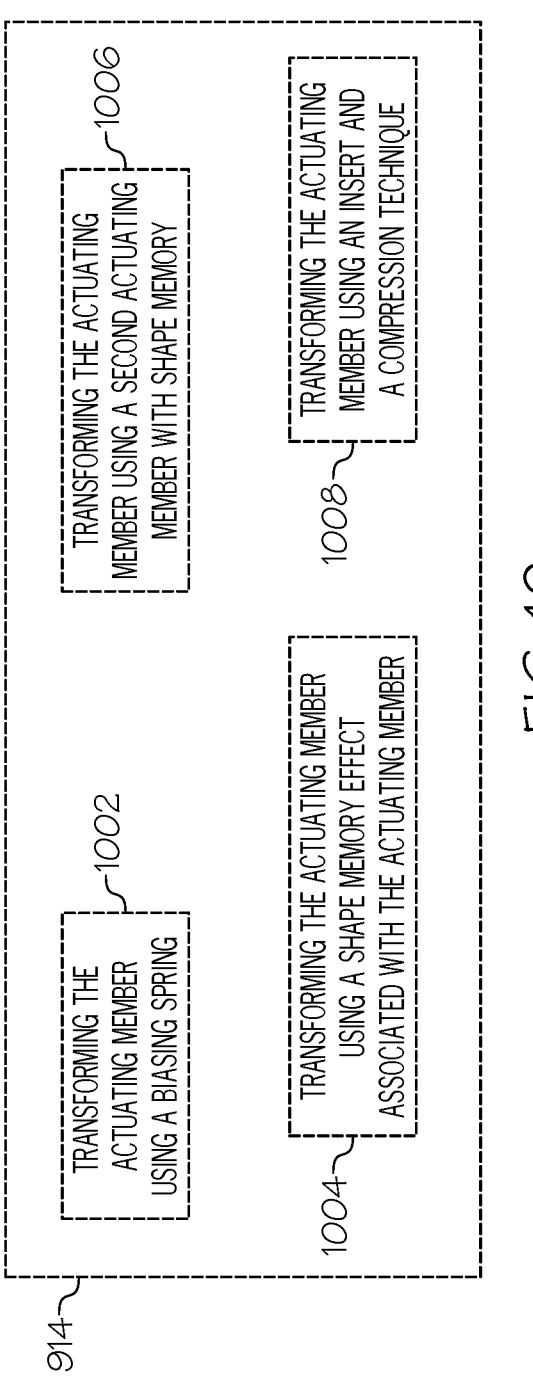
FIG. 10, in combination with FIG. 9, is a flow diagram showing several examples for the transforming of the actuating member from the active position to the inactive position in FIG. 9.

Referring generally to FIGS. 1A, 9 and 10, by way of examples, the present disclosure is directed to a method 900 for tacking workpieces in composite manufacturing. FIG. 9 discloses an example of the method 900 that includes selectively heating 902 a heating member 106, transforming 904 an actuating member from an inactive position 108 to an active position 110, and locally tacking 906 a first workpiece 114 to at least an adjacent workpiece 118. FIG. 10 discloses various other examples of the method 900.

With reference again to FIGS. 1A and 9, in one or more examples, a method 900 for tacking workpieces in composite manufacturing includes selectively heating 902 a heating member 106 of a tacking element 100. At 904, an actuating member 104 is transformed from an inactive position 108 to an active position 110. At 906, a first workpiece 114 of a stack of workpieces 116 is locally tacked to at least an adjacent workpiece 118 of the stack of workpieces 116 while the actuating member 104 is in the active position 110. For example, a given workpiece (e.g., first workpiece 114) may also be referred to as a ply. In this example, the stack of workpieces 116 may also be referred to as a stack of plies. In various examples, a given ply may be referred to as a reinforcement fabric that includes carbon fibers and/or other types of suitable fibers. Thermoplastic and/or resin is included in the stack of workpieces 116 (e.g., stack of plies) using any suitable technique. For example, a thermoplastic veil may be between adjacent plies or interleaved in the stack. In some examples, a ply may refer to the combination of the dry fabric and an accompanying veil. Alternatively, thermoplastic particles may be integrated into the dry fabric in any suitable manner. For example, the fabric may be pre-impregnated with resin which is referred to as pre-impregnated fabric or pre-preg. In any regard, the tacking operation heats the thermoplastic and/or resin to tack two or more layers of the stack of workpieces 116.

In another example of the method 900, the actuating member 104 includes a shape memory alloy. In yet another example of the method 900, the transforming 904 of the actuating member 104 to the active position 110 is in response to heat radiating from the heating member 106. In still another example of the method 900, the transforming 904 of the actuating member 104 to the active position 110 is in response to heat reaching a predetermined temperature. For example, the predetermined temperature may range from 200° C. to 280° C. In another example, the predetermined head may be up to 300° C.

In still yet another example of the method 900, in conjunction with the transforming 904 and the tacking 906, the active position 110 of the actuating member 104 is proximate to a work surface 112 of the first workpiece 114 of the stack of workpieces 116. In a further example, the tacking element 100 is embedded in a support structure 120. The support structure 120 includes a contact surface 122. The tacking element 100 extends through the contact surface 122 of the support structure 120. In an even further example, the method 900 also includes engaging 908 the contact surface 122 of the support structure 120 with the work surface 112 of the first workpiece 114. The method 900 continues from 908 to 902. In another further example, the tacking 906 is in response to at least one of the actuating member 104 and the heating member 106 being disposed proximate to the work surface 112 of the first workpiece 114. In yet another further example, the tacking 906 is in response to at least one of the actuating member 104 and the heating member 106 at least temporarily contacting the work surface 112 of the first workpiece 114. For example, the support structure 120 may include a plurality of cavities configured to receive the plurality of tacking elements 100 to facilitate the embedding.

In another example, the method 900 continues from 906 to 910 where the stack of workpieces 116 is locally compressed while the actuating member 104 is in the active position 110. In a further example, the compressing 910 is in response to at least one of the actuating member 104 and the heating member 106 at least temporarily contacting a work surface 112 of the first workpiece 114 of the stack of workpieces 116. For example, in the active position, the actuating member 104 may be constructed of material capable of applying up to approximately 75 kPa units of pressure to the work surface 112 of the first workpiece 114.

In yet another example, the method 900 continues from 906 to 912 where the stack of workpieces 116 is locally compacted while the actuating member 104 is in the active position 110. In a further example, the compacting 912 is in response to at least one of the actuating member 104 and the heating member 106 at least temporarily contacting a work surface 112 of the first workpiece 114 of the stack of workpieces 116. For example, in the active position, the actuating member 104 may be constructed of material capable of applying up to approximately 75 kPa units of pressure to the work surface 112 of the first workpiece 114.

In still another example, the method 900 continues from 906 to 914 where the actuating member 104 is transformed from the active position 110 to the inactive position 108.

With reference again to FIGS. 1A, 9 and 10 in one or more examples, the transforming 914 of FIG. 9 includes at least one of: (i) transforming 1002 the actuating member 104 using a biasing spring 202; (ii) transforming 1004 the actuating member 104 using a shape memory effect associated with the actuating member 104; (iii) transforming 1006 the actuating member 104 using a second actuating member 204 with shape memory; and (iv) transforming 1008 the actuating member 104 using an insert 302 and a compression technique.

An example of the shape memory effect associated with the actuating member 104 is where the actuating member 104 includes a shape memory alloy capable of being trained to exhibit multiple shape memory effects. A first shape memory effect is triggered by the heating member 106 and transforms the actuating member 104 from an inactive position to an active position for the tacking operation. A second shape memory effect is triggered by a lower temperature that transforms the actuating member 104 from the active position to the inactive position after the tacking operation.

An example of a second actuating member 204 with shape memory is a second actuating member 204 that includes a shape memory alloy that is trained to be triggered to apply a force that transforms the actuating member 204 from the active position to the inactive position at a predetermined temperature. The tacking element 100 may include additional components, such as a second heating member, to radiate heat that triggers the second actuating member 204.

Figure 11B:
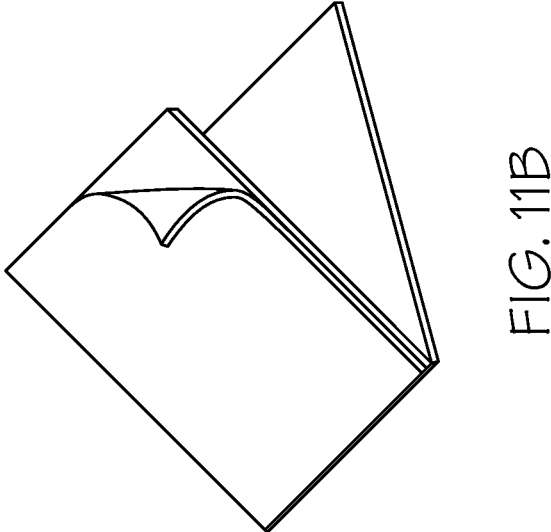
FIGS. 11A-B provide perspective views of examples of plies of dry fabric before and after tacking.
Figure 11A:
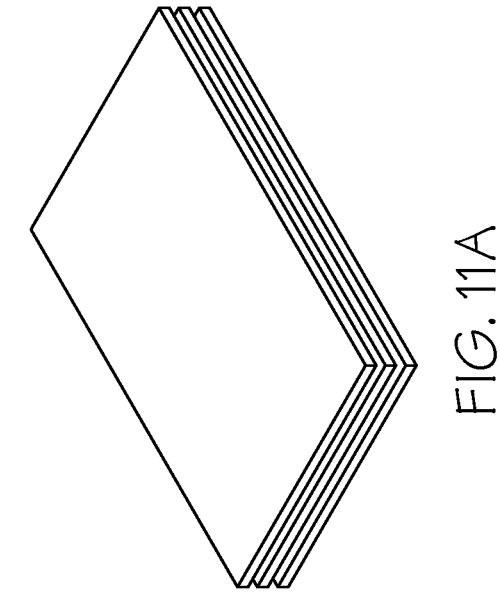

With reference again to FIGS. 11A-B, the drawing provides perspective views of examples of plies of dry fabric before and after tacking. The left view shows an example of a stack of plies of dry fabric before the tacking operation. The stack may include two or more plies. For example, the stack depth may be approximately 1.5 mm. Thermoplastic is included in the stack using any suitable technique. For example, a thermoplastic veil may be between adjacent plies or interleaved in the stack. In various examples, a given ply may be referred to as a reinforcement fabric that includes carbon fibers and/or other types of suitable fibers. Thermoplastic and/or resin is included in the stack of plies using any suitable technique. For example, a thermoplastic veil may be between adjacent plies or interleaved in the stack. In some examples, a ply may refer to the combination of the dry fabric and an accompanying veil. Alternatively, thermoplastic particles may be integrated into the dry fabric in any suitable manner. For example, the fabric may be pre-impregnated with resin in which the fabric is then referred to as pre-impregnated fabric or pre-preg. In any regard, the tacking operation heats the thermoplastic and/or resin to tack two or more layers of the stack. The right view shows an example of the top two plies tacked together after the tacking operation.

With reference again to FIGS. 12A-B, another example of a tacking element 100 for tacking workpieces in composite manufacturing includes a base member 102, an actuating member 104, and a heating member 106. The base member 102 may be at least partially bonded onto to membrane of a tacking stick 600. The heating member 106 may be disposed on a surface of the actuating member 104 (as shown). Alternatively, the heating member 106 may be disposed on an opposite surface of the actuating member 104 (not shown). As shown, the tacking element 100 has a circular footprint. In this example, the diameter for the footprint may be approximately 20 mm and may range from approximately 10 mm to approximately 35 mm. As shown, the heating member 106 is encapsulated in a square package. For example, the package dimensions may be approximately 5 mm$^2$. In other examples, the package dimensions may be approximately 10 mm$^2$, approximately 15 mm$^2$ or any suitable dimensions.

Figure 12B:
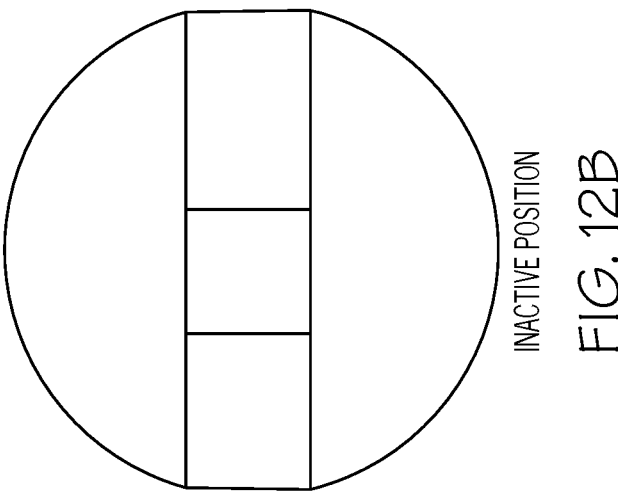
FIGS. 12A-B provides a perspective view of another example of a tacking element for tacking workpieces in composite manufacturing and a top view.
Figure 12A:
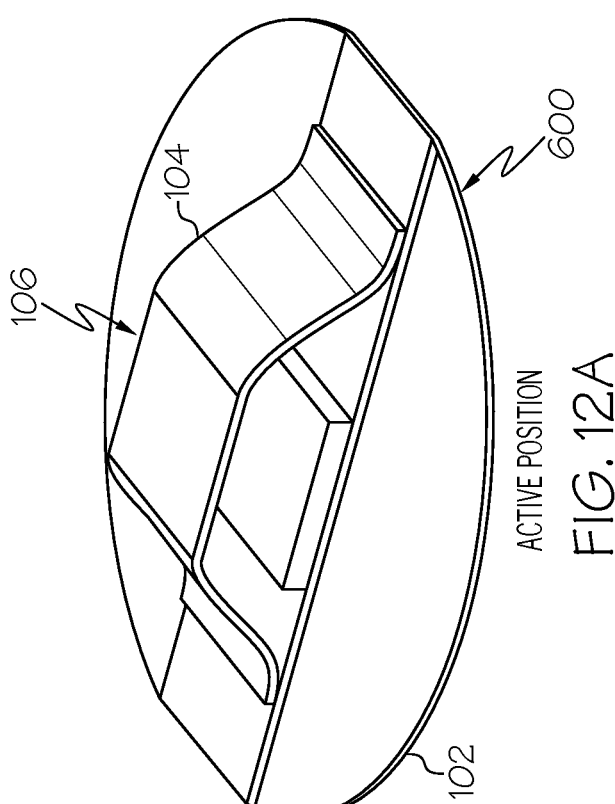
Figures 13A, 13B, 13C:
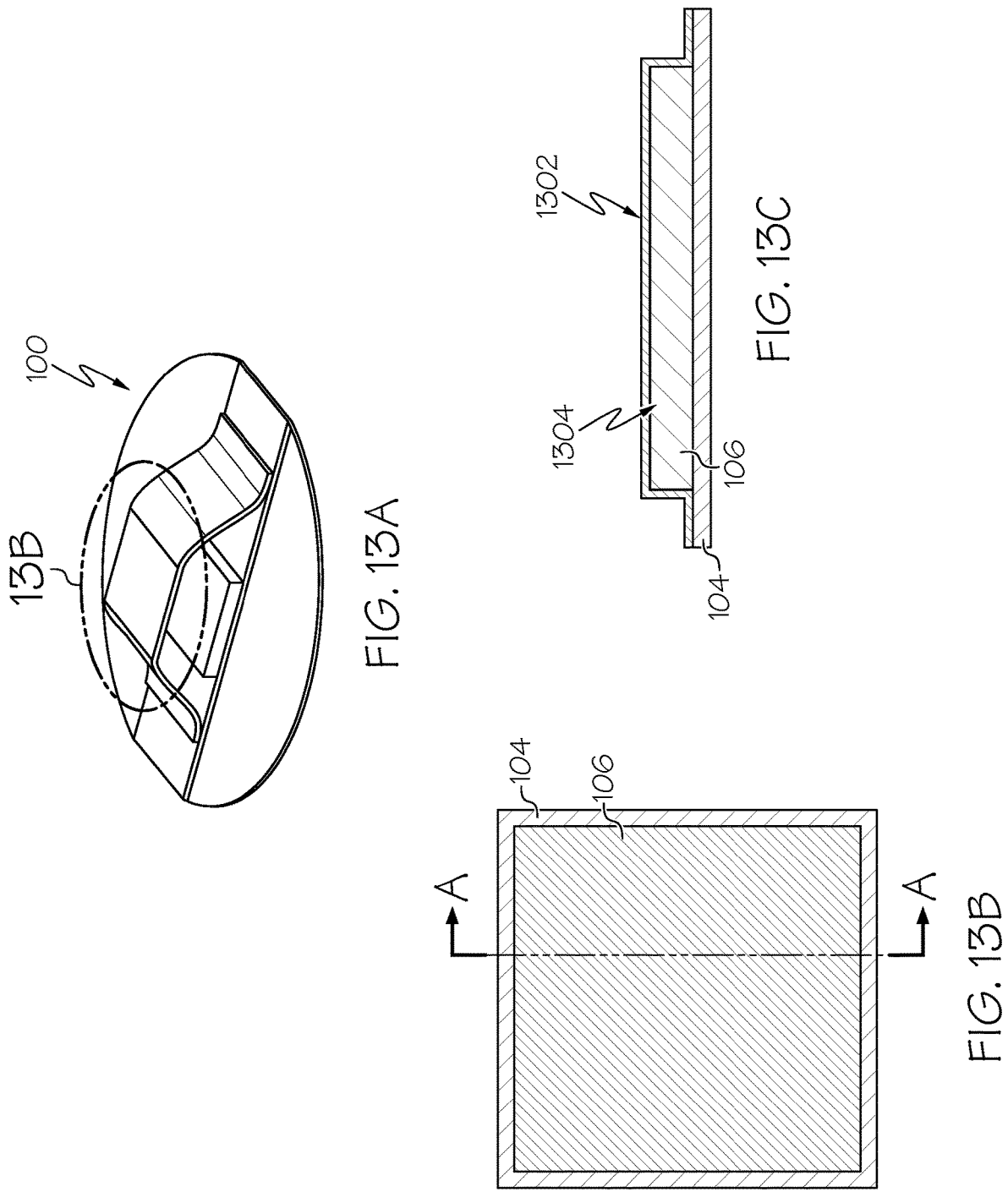
FIGS. 13A-C provide the perspective view of FIG. 12A, a detailed top view of the heating member and a cross-sectional view.
Figure 14:
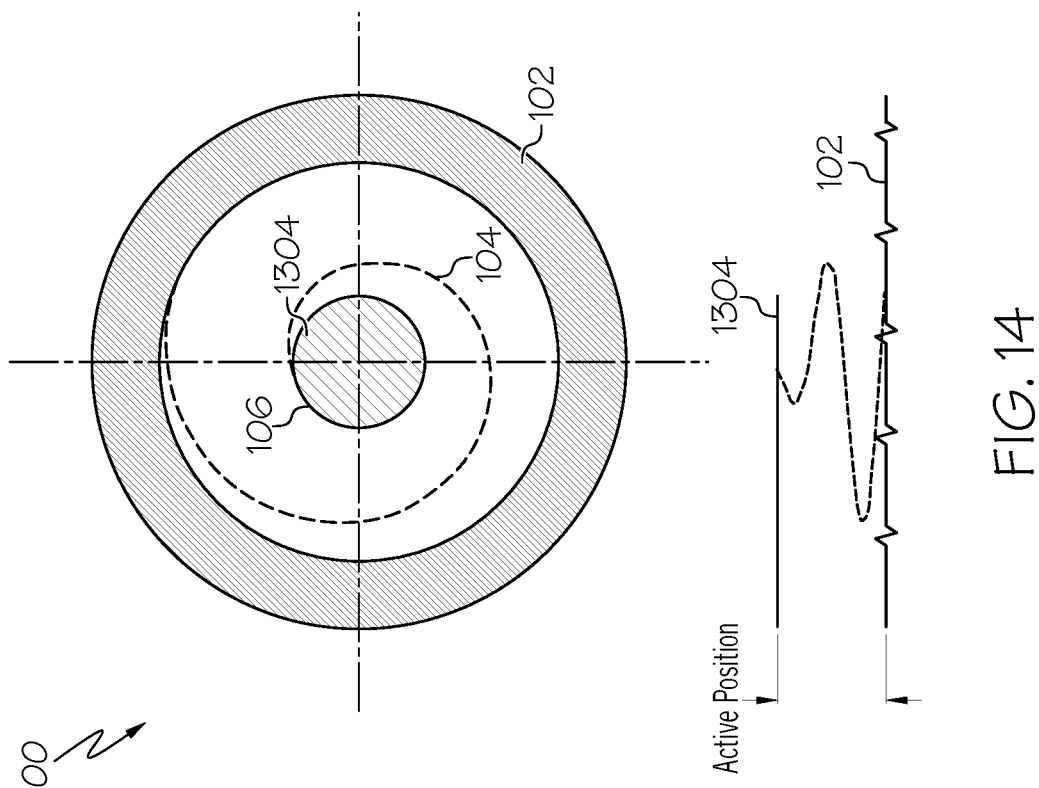
FIG. 14 provides a top schematic view of yet another example of a tacking element for tacking workpieces in composite manufacturing and a cross-sectional view.
Figure 15B:
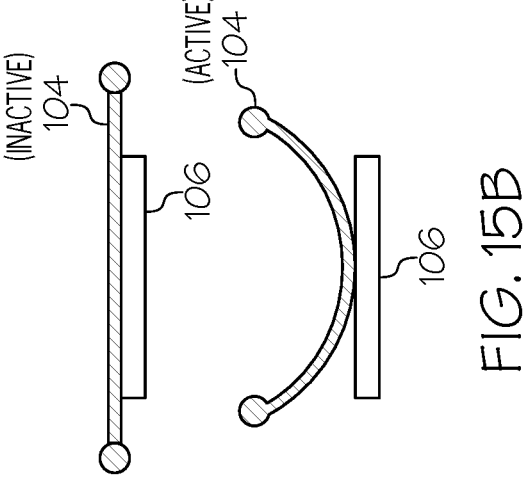
FIGS. 15A-B provide a partial top view of another example of a tacking stick for tacking workpieces in composite manufacturing and several detailed side views of another example of a tacking element in the tacking stick.
Figure 15A:
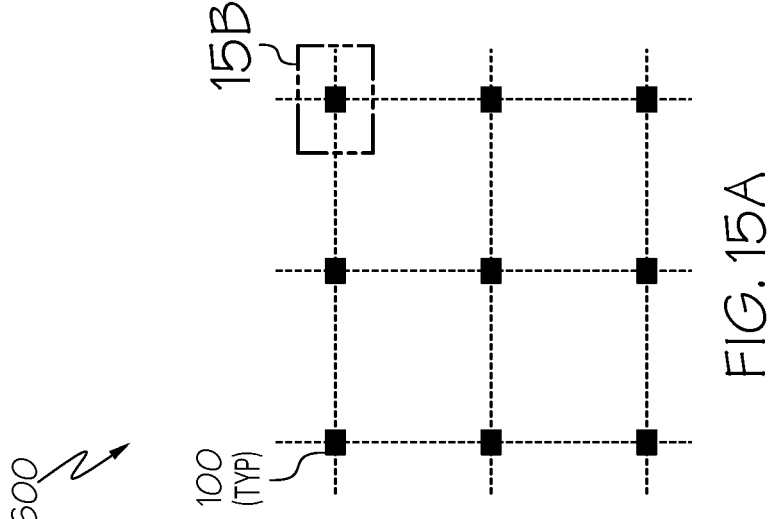
Figure 16:
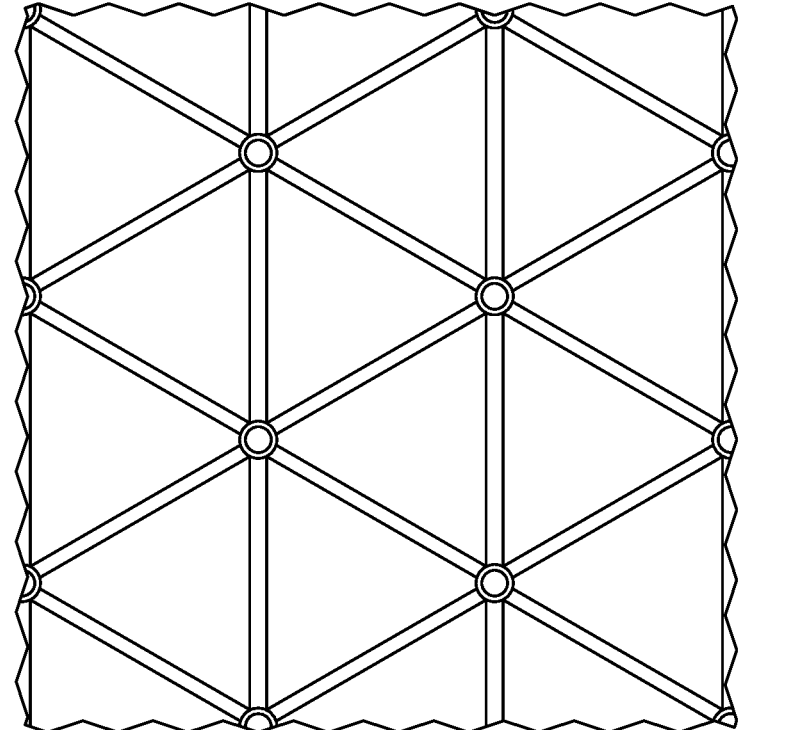
FIG. 16 provides a partial top view of yet another example of a tacking stick for tacking workpieces in composite manufacturing.

With reference again to FIGS. 13A-C, the drawing provides the perspective view of the tacking element 100 of FIG. 12A, a detailed top view of the heating member 106 and a portion of the actuating member and a cross-sectional view. The cross-section view shows the heating member 106 disposed on a surface of the actuating member 104 and an optional thermal conductive layer 1302 over a contact surface 1304 of the heating member 106. The contact surface 1304 of the heating member 106 is the portion of the tacking element 100 that proximates and/or contacts the work surface 112 of the first workpiece 114 of the stack of workpieces 116. The thermal conductive layer 1302 may include any suitable coating that permits suitable heat transfer and prevents residue from being deposited on the heating member 106 due to the tacking operation. Alternatively, although not shown, in another example, the heating member 106 may be disposed on an opposite surface of the actuating member 104. In this example, the contact surface 1304 is a raised portion of the actuating element. The thermal conductive layer 1302 may be used to coat the contact surface 1304 of the actuating member 104, additional portions surrounding the contact surface 1304 and/or the entire surface of the actuating member.

With reference again to FIG. 14, provides a top view of yet another example of a tacking element 100 for tacking workpieces in composite manufacturing and a cross-section view. The tacking element 100 includes a base member 102, an actuating member 104, and a heating member 106. As shown, the base member 102 has a circular footprint. In this example, the diameter for the footprint for the base member 102 may be approximately 20 mm. The actuating member 104 is shown in a spiral, spring-like shape that moves from an inactive position (not shown) at low temperature (e.g., room temperature) to an active position (as shown) at high temperature (e.g., greater than 120° C.). The actuating member 104 having a proximal end secured to the base member 102 and a distal end to which the heating member 106 is secured. As shown, the heating member 106 also has a circular footprint. In this example, the diameter for the footprint for the heating member 106 may be approximately 5 mm. The heating member 106 includes a contact surface 1304 that, in the active position (as shown), proximates and/or contacts the work surface 112 of the first workpiece 114 of the stack of workpieces 116.

With reference again to FIGS. 15A-B, the drawing provides a partial top view of another example of a tacking stick 600 for tacking workpieces in composite manufacturing and several detailed side views of another example of a tacking element 100 in the tacking stick 600. In this example, the partial top view shows a portion of the tacking stick 600 with nine tacking elements 100 arranged in an array. The detailed side views show the actuating member 104 and the heating member 106 of a typical tacking element 100 for this tacking stick 600. The actuating member 104 is shown at room temperature in the inactive position and at high temperature (e.g., greater than 120° C.) in the active position. In this example, the actuating member 104 includes a shape memory alloy and the heating member 106 may include a Micro Heater manufactured by Innovative Sensor Technology IST AG of Ebnat-Kappel, Switzerland or a suitable equivalent.

With reference again to FIG. 16, the drawing provides a partial top view of yet another example of a tacking stick 600 for tacking workpieces in composite manufacturing. In this example, the partial top view shows a portion of the tacking stick 600 with twelve tacking elements 100 arranged in rows. Alternating rows are offset by half the distance between adjacent tacking elements 100 in the preceding and succeeding rows. This creates alternating diamond and X-shapes for groups of four tacking elements 100 as one moves horizontally across three consecutive rows.

Examples of the tacking element 100, tacking stick 600, system 800, and method 900 may be related to, or used in the context of tacking workpieces (e.g., dry fabrics) for thermoplastic composite parts used in aircraft manufacturing. Although an aircraft example is described, the examples and principles disclosed herein may be applied to other products in the aerospace industry and other industries, such as the automotive industry, the space industry, the construction industry, and other design and manufacturing industries. Accordingly, in addition to aircraft, the examples and principles disclosed herein may apply to stamp forming workpieces to form an assembly for other types of vehicles (e.g., land vehicles, marine vehicles, space vehicles, etc.), stand-alone structures, high-traffic surfaces, and other high-contact surfaces.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 9 and 10, referred to above, the blocks may represent operations, steps, and/or portions thereof, and lines connecting the various blocks do not imply any particular order or dependency of the operations or portions thereof. It will be understood that not all dependencies among the various disclosed operations are necessarily represented. FIGS. 9 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

FIGS. 1A-D, 2A-D, 3A-B, 4A-D, 5, 6A-B. 7, 8, 11A-B, 12A-B, 13A-C, 14, 15A-B and 16, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1A-D, 2A-D, 3A-B, 4A-D, 5, 6A-B. 7, 8, 11A-B, 12A-B, 13A-C, 14, 15A-B and 16, referred to above, need be included in every example and not all elements, features, and/or components described herein are necessarily depicted in each illustrative example. Accordingly, some of the elements, features, and/or components described and illustrated in FIGS. 1A-D, 2A-D, 3A-B, 4A-D, 5, 6A-B. 7, 8, 11A-B, 12A-B, 13A-C, 14, 15A-B and 16 may be combined in various ways without the need to include other features described and illustrated in FIGS. 1A-D, 2A-D, 3A-B, 4A-D, 5, 6A-B. 7, 8, 11A-B, 12A-B, 13A-C, 14, 15A-B and 16, other drawing figures, and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 8, 11A-B, 12A-B, 13A-C, 14, 15A-B and 16, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1A-D, 2A-D, 3A-B, 4A-D, 5, 6A-B. 7, 8, 11A-B, 12A-B, 13A-C, 14, 15A-B and 16, and such elements, features, and/or components may not be discussed in detail herein with reference to each of FIGS. 1A-D, 2A-D, 3A-B, 4A-D, 5, 6A-B. 7, 8, 11A-B, 12A-B, 13A-C, 14, 15A-B and 16. Similarly, all elements, features, and/or components may not be labeled in each of FIGS. 1A-D, 2A-D, 3A-B, 4A-D, 5, 6A-B. 7, 8, 11A-B, 12A-B, 13A-C, 14, 15A-B and 16, but reference numerals associated therewith may be utilized herein for consistency.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

Figure 17:
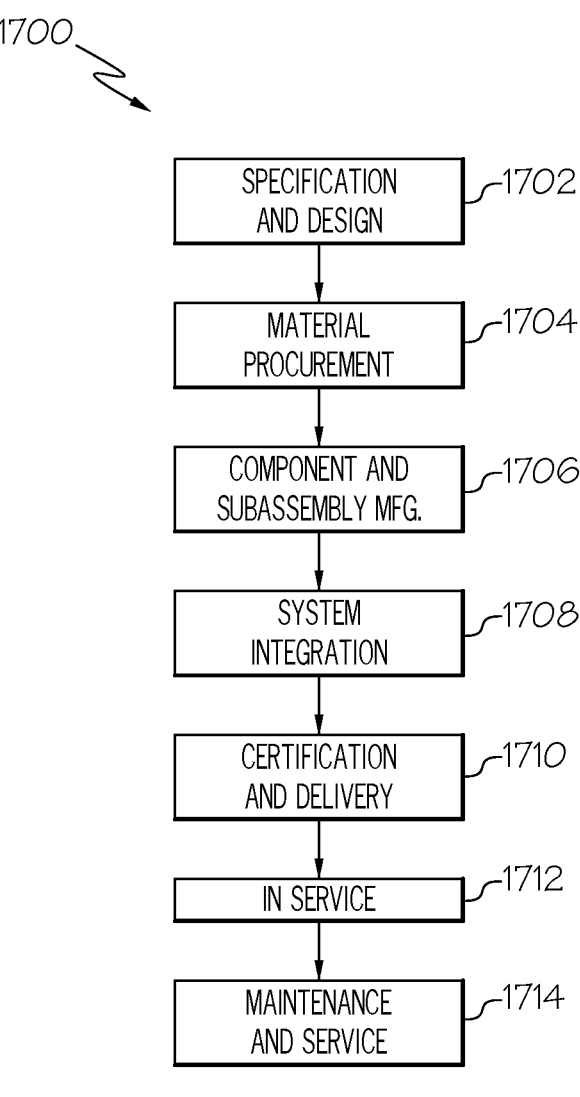
FIG. 17 is a block diagram of aircraft production and service methodology.
Figure 18:
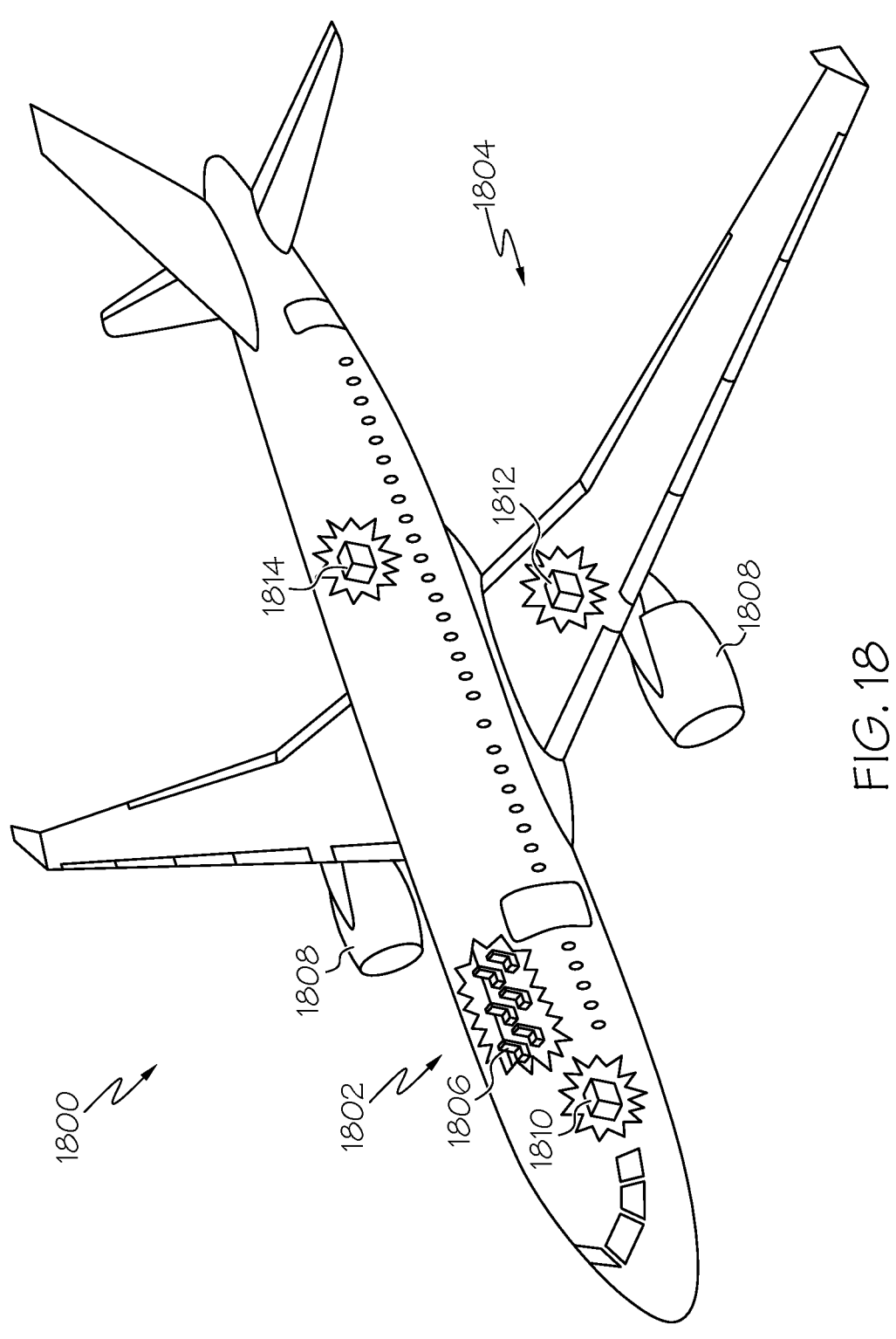
FIG. 18 is a schematic illustration of an aircraft.

Examples of the subject matter disclosed herein may be described in the context of aircraft manufacturing and service method 1700 as shown in FIG. 17 and aircraft 1800 as shown in FIG. 18. In one or more examples, the disclosed methods and systems for associating test data for a part under test with an end item coordinate system may be used in aircraft manufacturing. During pre-production, the service method 1700 may include specification and design (block 1702) of aircraft 1800 and material procurement (block 1704). During production, component and subassembly manufacturing (block 1706) and system integration (block 1708) of aircraft 1800 may take place. Thereafter, aircraft 1800 may go through certification and delivery (block 1710) to be placed in service (block 1712). While in service, aircraft 1800 may be scheduled for routine maintenance and service (block 1714). Routine maintenance and service may include modification, reconfiguration, refurbishment, etc. of one or more systems of aircraft 1800.

Each of the processes of the service method 1700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 18, aircraft 1800 produced by the service method 1700 may include airframe 1802 with a plurality of high-level systems 1804 and interior 1806. Examples of high-level systems 1804 include one or more of propulsion system 1808, electrical system 1810, hydraulic system 1812, and environmental system 1814. Any number of other systems may be included. Although an aerospace example is shown, the principles disclosed herein may be applied to other industries, such as the automotive industry. Accordingly, in addition to aircraft 1800, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1700. For example, components or subassemblies corresponding to component and subassembly manufacturing (block 1706) may be fabricated or manufactured in a manner similar to components or subassemblies produced while aircraft 1800 is in service (block 1712). Also, one or more examples of the system(s), method(s), or combination thereof may be utilized during production stages (block 1706 and block 1708), for example, by substantially expediting assembly of or reducing the cost of aircraft 1800. Similarly, one or more examples of the system or method realizations, or a combination thereof, may be utilized, for example and without limitation, while aircraft 1800 is in service (block 1712) and/or during maintenance and service (block 1714).

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the tacking element 100, tacking stick 600, system 800, and method 900 have been shown and described, modifications may occur to those skilled in the art upon reading the specification. The present application includes such modifications and is limited only by the scope of the claims.

What is claimed is:

1. An apparatus for tacking workpieces in composite manufacturing, the apparatus comprising:
   a base member;
   a shape memory member at least partially secured to the base member; and
   heater member disposed on at least one of the base member and the shape memory member and configured to selectively radiate heat toward the shape memory member,
   wherein the shape memory member is configured to transform from an inactive position to an active position in response to the heat from the heater member,
   wherein the apparatus is configured to be disposed such that the active position of the shape memory member is proximate to a work surface of a first workpiece of a stack of workpieces, and
   wherein the apparatus is configured to locally tack the first workpiece to at least an adjacent workpiece of the stack of workpieces in response to the heat from the heater member and the shape memory member being in contact with the work surface of the first workpiece in the active position.

2. The apparatus of claim 1, wherein the shape memory member comprises a shape memory alloy.

3. The apparatus of claim 2, wherein the shape memory alloy comprises at least one of aluminium, cadmium, copper, gold, iron, manganese, nickel, silicon, titanium, and zinc.

4. The apparatus of claim 2, wherein the shape memory alloy comprises at least one of nickel-titanium, copper-aluminum-nickel, copper-zinc-aluminum, iron-manganese-silicon, and gold-cadmium.

5. The apparatus of claim 1, wherein the shape memory member is configured to transform to the active position in response to the heat reaching a predetermined temperature.

6. The apparatus of claim 1, wherein the apparatus is configured to be embedded in a support structure comprising a contact surface, wherein the apparatus is configured to extend through the contact surface of the support structure.

7. The apparatus of claim 6, wherein the contact surface of the support structure opposes the work surface of the first workpiece, wherein the contact surface is configured to engage with the work surface.

8. The apparatus of claim 1, wherein the apparatus is configured to locally tack the first workpiece to at least an adjacent workpiece of the stack of workpieces in response to the heater member being disposed proximate to the work surface of the first workpiece while the shape memory member is in the active position.

9. The apparatus of claim 1, wherein the apparatus is configured to locally tack the first workpiece to at least an adjacent workpiece of the stack of workpieces in response to the shape memory member contacting the work surface of the first workpiece while the shape memory member is in the active position.

10. The apparatus of claim 1, wherein the apparatus is configured to locally compress the stack of workpieces in response to the shape memory member contacting the work surface of the first workpiece while the shape memory member is in the active position.

11. The apparatus of claim 1, wherein the apparatus is configured to locally compact the stack of workpieces in response to the shape memory member contacting the work surface of the first workpiece while the shape memory member is in the active position.

12. The apparatus of claim 1, wherein the apparatus is configured to transform the shape memory member from the active position to the inactive position using at least one of a biasing spring, a shape memory effect associated with the shape memory member, a second shape memory member, and an insert fitted for compression of the shape memory member.

13. The apparatus of claim 1, wherein the base member comprises an insulating material.

14. The apparatus of claim 1, wherein the shape memory member comprises a first surface facing the base member and a second surface configured to face a work surface of a first workpiece of a stack of workpieces.

15. The apparatus of claim 14, wherein the heater member is secured to the first surface of the shape memory member.

16. The apparatus of claim 14, wherein the heater member is secured to the second surface of the shape memory member.

17. The apparatus of claim 1, wherein the heater member is embedded within the shape memory member.

18. The apparatus of claim 1, wherein the heater member comprises a packaged heat source and at least two leads, wherein the packaged heat source is less than 3 mm in height with a planar area of less than 30 mm2.

19. The apparatus of claim 1, wherein the heater member comprises at least one of a micro heater, a thick film heater, and a resistive heating element.

20. The apparatus of claim 1, wherein the heater member is configured to receive electrical power from an external power source.

21. A tacking stick for tacking workpieces in composite manufacturing, the tacking stick comprising:
   a support structure comprising a contact surface opposing a work surface of a first workpiece of a stack of workpieces, wherein the contact surface of the support structure is configured to engage with the work surface of the first workpiece; and
   a plurality of tacking elements embedded in the support structure, wherein each tacking element extends through the contact surface of the support structure, each tacking element comprising:
      a base member;
      a shape memory member at least partially secured to the base member; and
      a heater member disposed on at least one of the base member and the shape memory member, and
   wherein the plurality of tacking elements are configured to be disposed within the support structure such that the active position of the shape memory member of each tacking element is proximate to a work surface of a first workpiece of a stack of workpieces, and wherein the tacking stick is configured such that at least one of the plurality of tacking elements locally tacks the first workpiece to at least an adjacent workpiece of the stack of workpieces in response to the shape memory member of the corresponding tacking element being in contact with the work surface of the first workpiece in the active position.

22. A method for tacking workpieces in composite manufacturing, the method comprising:

selectively heating a heater member of a tacking element;

transforming a shape memory member from an inactive position to an active position; and locally tacking a first workpiece of a stack of workpieces to at least an adjacent workpiece of the stack of workpieces while the shape memory member is in the active position, and wherein, in response to the heating and the transforming, the active position causes the shape memory member to become proximate to a work surface of the first workpiece of the stack of workpieces, and wherein, in conjunction with the tacking, the shape memory member is in the active position and in contact with the work surface of the first workpiece.

23. A system for tacking workpieces in composite manufacturing, the system comprising:

an end effector comprising a tacking stick, the tacking stick comprising:

a support structure comprising a contact surface; and a plurality of tacking elements embedded in the support structure, wherein the plurality of tacking elements extend through the contact surface of the support structure, wherein each tacking element comprises:

a base member;

a shape memory member at least partially secured to the base member; and a heater member disposed on at least one of the base member and the shape memory member;

a mechanical arm configured to receive the end effector; and a computerized control system configured to control the mechanical arm, the end effector, the tacking stick, and the plurality of tacking elements by implementing a method for tacking workpieces in composite manufacturing, the method comprising:

selectively heating the heater member of a select tacking element;

transforming the shape memory member of the select tacking element from an inactive position to an active position; and locally tacking a first workpiece of a stack of workpieces to at least an adjacent workpiece of the stack of workpieces while the shape memory member of the select tacking element is in the active position, and wherein the plurality of tacking elements are configured to be disposed within the support structure such that the active position of the shape memory member of each tacking element is proximate to a work surface of a first workpiece of a stack of workpieces, and wherein the system is configured such that at least one of the plurality of tacking elements locally tacks the first workpiece to at least an adjacent workpiece of the stack of workpieces in response to the shape memory member of the corresponding tacking element being in contact with the work surface of the first workpiece in the active position.

24. The system of claim 23, wherein each tacking element of the plurality of tacking elements is configured to locally tack the first workpiece to at least an adjacent workpiece of the stack of workpieces in response to at least one of the shape memory member and the heater member being disposed proximate to the work surface of the first workpiece while the shape memory member is in the active position.

* * * * *